United States Patent
Hamada

(10) Patent No.: US 8,537,808 B2
(45) Date of Patent: Sep. 17, 2013

(54) SIP TELEPHONE SET, AND FILE TRANSFER SYSTEM, FILE TRANSFER METHOD AND FILE TRANSFER PROGRAM THEREOF

(75) Inventor: Yoshitaka Hamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/871,015

(22) Filed: Aug. 30, 2010

(65) Prior Publication Data

US 2011/0051720 A1 Mar. 3, 2011

(30) Foreign Application Priority Data

Sep. 2, 2009 (JP) ................................. 2009-202220

(51) Int. Cl.
*H04L 12/66* (2006.01)
(52) U.S. Cl.
USPC ........................................................ 370/352
(58) Field of Classification Search
USPC ................ 370/352, 356; 455/557; 709/230; 358/425
See application file for complete search history.

(56) References Cited

U.S. PATENT DOCUMENTS

| 7,359,373 | B2 | 4/2008 | Kuusinen et al. | |
|---|---|---|---|---|
| 2005/0037810 | A1* | 2/2005 | Bryson | 455/557 |
| 2005/0066372 | A1 | 3/2005 | Bertin | |
| 2006/0155864 | A1* | 7/2006 | Izumi | 709/230 |
| 2006/0159072 | A1* | 7/2006 | Kim et al. | 370/352 |
| 2007/0047531 | A1* | 3/2007 | Malhotra et al. | 370/356 |
| 2008/0013524 | A1* | 1/2008 | Hwang et al. | 370/352 |
| 2008/0117474 | A1* | 5/2008 | Miura | 358/425 |

FOREIGN PATENT DOCUMENTS

| JP | 2005-503718 A | | 2/2005 |
|---|---|---|---|
| JP | 2005-080025 A | | 3/2005 |
| JP | 2005064761 | * | 3/2005 |
| JP | 2005064761 A | | 3/2005 |
| JP | 2005-293065 A | | 10/2005 |
| JP | 2006-311125 A | | 11/2006 |
| JP | 2007-508766 A | | 4/2007 |
| JP | 2009-176289 A | | 8/2009 |

OTHER PUBLICATIONS

Itu-T, T.38—"procedures for real time group 3 facsimile communication over IP networks", Apr. 2007.*
Japanese Office Action for JP2009-202220 mailed on Feb. 6, 2013.
Japanese Office Action for JP Application No. 2009-202220 mailed on May 13, 2013 with Partial English Translation.

* cited by examiner

*Primary Examiner* — Asad Nawaz
*Assistant Examiner* — Parth Patel

(57) ABSTRACT

Provided is service for transmitting and receiving a file between a calling device and a call receiving device without depending on a capacity of a proxy server.
An SIP telephone set (calling device 11) which makes a call through a proxy server 13 to establish a session for a voice path with a call receiving device 12 conformed to SIP, comprising a request issuing unit 111 which requests the call receiving device 12 to establish a session for a data path by the pressing of a specific extension at the time of establishment of a session for a voice path, a session establishing unit 112 which obtains an access authentication result by the pressing of the specific extension to establish a session for a data path with the call receiving device 12, and a file obtaining unit 113 which obtains a file managed by the call receiving device 12 from the call receiving device 12 independently of the proxy server 13 after a session for a data path is established.

6 Claims, 7 Drawing Sheets

FILE TRANSFER SYSTEM 10

FIG. 3

T11;re-INVITE w/SDP

```
v=0
o=mhandley 2890544526 2000040007 IN IP4 126.16.64.4
s=SDP Seminar i=A Semi[        ]ption protocol
u=http://www.cs.ucl.ac.uk[     MEDIA TYPE    ]sdp.03.ps
e=mjh@isi.edu(Mark Hand[                   ]
c=IN IP4 224.2.17.12/127[   PORT NUMBER    ]
t=2873397496 2873404696[                   ]
a=recvonly              [     PROTOCOL     ]
m=audio 49170 RTP/AVP   [                   ]
m=video 51372 RTP/AVP   [      FORMAT      ]
m=application 32416/udp wb
m=file 10000 udp wb
s=orient:portrait
```

SIP TELEPHONE SET, AND FILE TRANSFER SYSTEM, FILE TRANSFER METHOD AND FILE TRANSFER PROGRAM THEREOF

INCORPORATION BY REFERENCE

This application is based upon and claims the benefit of priority from Japanese patent application No. 2009-202220, filed on Sep. 2, 2009, the disclosure of which is incorporated herein in its entirety by reference.

TECHNICAL FIELD

The present invention relates town SIP telephone set, and a file transfer system, a file transfer method and a file transfer program of the apparatus which makes a call through a proxy to establish a session for a voice path with a device receiving the call conformed to SIP (Session Initiation Protocol).

BACKGROUND ART

In the above-described SIP telephone set, for accessing a file under the management of a certain call receiving device located in the distance, required is communication by FTP (File Transfer Protocol) or HTTP (Hyper Text Transfer Protocol). In a case, for example, where a session for a voice path is set during telephone conference, it is necessary to establish a session for a data path by FTP or HTTP in order to download a file under the management of a call receiving device other than a session route for the voice path.

In a case where a file exchange application to which voice communication software is newly applied is used, file transmission/reception should be executed through a node equivalent to a proxy server and its transfer rate depends on a capacity of the proxy server. Under these circumstances, demanded is a system which enables file transmission/reception service to be provided without depending on a capacity of a proxy server.

On the other hand, as disclosed, for example, in Patent Literature 1, known is an IP telephone set in which, for enabling reception of text information in line with communication of voice and video, a request for establishing a communication session for the transmission/reception of the text information is generated and the communication session is established based on the request.

Patent Literature 1: Japanese Patent Laying-Open No. 2005-64761.

According to the technique disclosed in the above-described Patent Literature 1, it is possible to realize voice communication and file transmission/reception between a caller and a call receiver by using SIP. For realizing the file transmission/reception service, however, a session for a voice path for voice communication is required and a file transfer rate still depends on a capacity of a proxy server.

OBJECT OF THE INVENTION

An object of the present invention is to provide an SIP telephone set, and a file transfer system, a file transfer method and a file transfer program of the apparatus which enables file transmission/reception service between a calling device and a call receiving device without depending on a capacity of a proxy server.

SUMMARY

According to a first exemplary aspect of the invention, an SIP telephone set which makes a call through a proxy server to establish a session for a voice path with a call receiving device conformed to SIP (Session Initiation Protocol), includes a request issuing unit which requests the call receiving device to establish a session for a data path by the pressing of a specific extension at the time of establishment of a session for the voice path, a session establishing unit which obtains an access authentication result by the pressing of the specific extension to establish a session for a data path with the call receiving device, and a file obtaining unit which obtains a file managed by the call receiving device from the call receiving device independently of the proxy server after a session for the data path is established.

According to a second exemplary aspect of the invention, a file transfer method in an SIP telephone set in which a calling device and a call receiving device establish a session for a voice path through a proxy server to communicate conformed to SIP, includes a first step by the calling device to request the call receiving device to establish a session for a data path by the pressing of a specific extension at the time of establishment of a session for the voice path, a second step by the call receiving device to receive a request for establishing a session for the data path from the calling device to execute access authentication of the calling device, and a third step by the calling device to obtain a result of the access authentication from the call receiving device to establish a session for a data path with the call receiving device, and after the session for the data path is established, obtain a file managed by the call receiving device from the call receiving device independently of the proxy server.

According to a third exemplary aspect of the invention,
A computer readable medium storing a file transfer program of an SIP telephone set executed on a computer to make a, call through a proxy server and establish a session for a voice path with a call receiving device conformed to SIP, the file transfer program causes the computer to execute a request issuing processing of requesting the call receiving device to establish a session for a data path by the pressing of a specific extension at the time of establishment of a session for the voice path, a session establishing processing of obtaining an access authentication result by the pressing of the specific extension to establish a session for a data path with the call receiving device, and a file obtaining processing of obtaining a file managed by the call receiving device from the call receiving device independently of the proxy server after the session for the data path is established.

According to the present invention, it is possible to provide an SIP telephone set, and a file transfer system, a file transfer method and a file transfer program of the apparatus which enables file transmission/reception service between a calling device and a call receiving device without depending on a capacity of a proxy server.

The reason is that the calling device obtains an access authentication result from the call receiving device by the pressing of a specific extension and establishes a session for a data path to automatically obtain a file managed by the call receiving device. After establishing a session for a voice path with the call receiving device, the calling device is allowed to execute a transaction with the call receiving device without passing through a proxy server.

BRIEF DESCRIPTION OF THE DRAWINGS

FIG. 3 is a diagram showing one example of SDP description which realizes a file acquisition interface of the SIP telephone set according to the present exemplary embodiment;

EXEMPLARY EMBODIMENT

Next, exemplary embodiments of the present invention will be described in detail with reference to the drawings.

Structure of First Exemplary Embodiment

Figure 1:
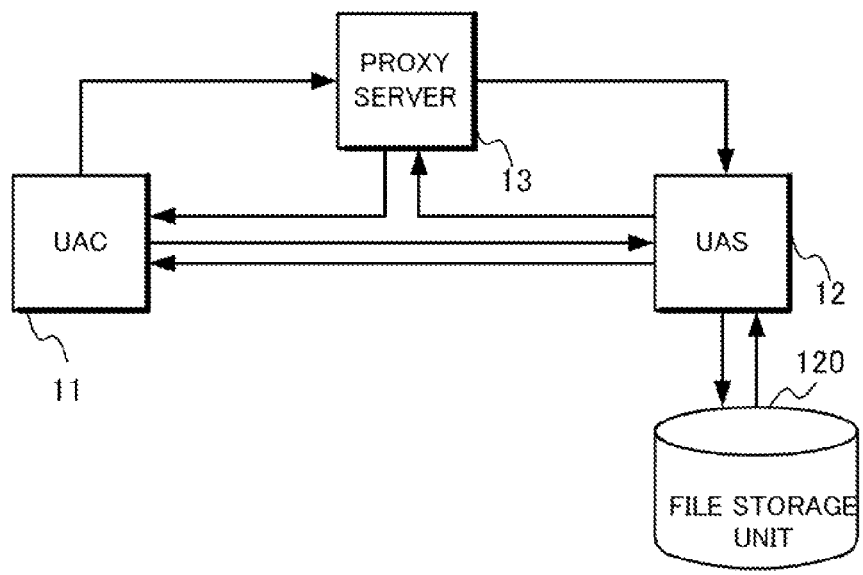
FIG. 1 is a block diagram showing a structure of a file transfer system in an SIP telephone set according to a present exemplary embodiment.

FIG. 1 is a block diagram showing a structure of a file transfer system in an SIP telephone set according to the present exemplary embodiment.

As is well known, SIP is a protocol for establishing a session between two or more clients for use in IP telephone or the like to which a multi-media session or VoIP (Voice over Internet Protocol) is applied, and information of such a communication apparatus for executing communication by an actual telephone set or the like is processed by SDP (Session Description Protocol) and RTP (Real-time Transport Protocol) is used for data communication. In other words, SIP is a protocol of a session layer which provides only a basic function such as start, change and end of a session.

With reference to FIG. 1, a file transfer system 10 in the SIP telephone set according to the present exemplary embodiment includes a calling device (UAC 11) as an SIP telephone set, a call receiving device (UAS 12) and a proxy server (Proxy 13).

User agent, which is a logical element for processing an SIP request, has two kinds, UAC (User Agent Client) and UAS (User Agent Server). The SIP telephone set here makes a UAC at the time of making a call and a UAS at the time of receiving a call. Therefore, the former UAC will be referred to as the calling device 11 and the latter UAS will be referred to as the call receiving device 12.

The calling device 11 generates and transmits an SIP request, and receives and processes a response. The call receiving device 12 receives and processes the SIP request, and generates and transmits a response. The call receiving device 12 stores a file under its own management into a file storage unit 120. The proxy server 13 is a server which solves a subsequent transfer destination of the SIP request and transfers the request.

With the above-described system structure, in the file transfer system 10 according to the present exemplary embodiment, at the time of establishment of a voice path session, the calling device 11 requests the call receiving device to establish a data path session by the pressing of a specific extension and the call receiving device 12 receives the data path session establishment request from the calling device 11 to authenticate an access to the calling device 11. Then, the calling device 11 obtains a result of the access authentication from the call receiving device 12 to establish a session for a data path with the receiving device 12 and after establishing a session for the data path, executes operation of obtaining a file managed by the call receiving device 12 from the call receiving device by downloading from the file storage unit 120 independently of the proxy server 13. Details of the operation will be described later.

Figure 2:
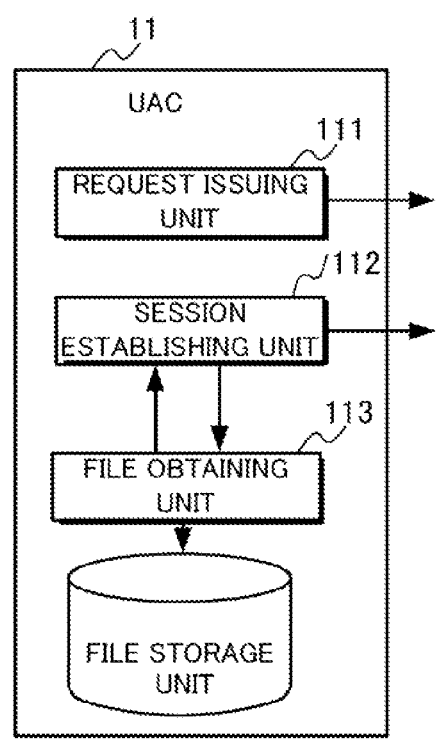
FIG. 2 is a block diagram showing a structure of the SIP telephone set according to the present exemplary embodiment.

FIG. 2 is a block diagram showing a structure of the SIP telephone set (the calling device 11) according to the present exemplary embodiment. With reference to FIG. 2, the calling device 11 includes a request issuing unit 111, a session establishing unit 112 and a file obtaining unit 113.

The request issuing unit 111 has a function of requesting the call receiving device 12 to establish a session for a data path by the pressing of a specific extension at the time of establishing a session for a voice path. The extension here is a specific key pressing sequence defined in advance between the calling device 11 and the call receiving device 12, which is premised on, for example, that numeral keys 1, 3 and 5 are sequentially pressed.

The session establishing unit 112 has a function of obtaining an access authentication result from the call receiving device 12 by the pressing of a specific extension to establish a session for a data path with the call receiving device 12.

Therefore, when establishing a session for a voice path and a data path, the session establishing unit 112 makes a response to a request for confirmation that no voice path will be abandoned from the call receiving device 12 and instructs the file obtaining unit 113 which will be described later to obtain a file through the established voice path and data path and when cutting off the session for the data path or establishing only a data session after the file acquisition, makes a response to a request for confirmation that the voice path will be abandoned from the call receiving device 12 and instructs the file obtaining unit 113 which will be described later to obtain a file through the established data path and after the file acquisition, cuts off the session for the data path.

The file obtaining unit 113 has a function of obtaining, after a session for a data path is established by the data path establishing unit 112, a file (which is registered in the file storage unit 120) managed by the call receiving device 12 from the call receiving device 12 independently of the proxy server 13.

The file obtaining unit 113 therefore includes, as a media type of SDP which will be described later, an interface for decoding description newly defined for obtaining a file from the call receiving device 12 and an application for, after establishment of a data path by the session establishing unit 112, issuing a file acquisition request to the call receiving device 12 to obtain a requested file from the call receiving device 12 and again issuing a file acquisition request or ending based on collation of a result of error checking executed at the call receiving device 12.

FIG. 3 shows one example of SDP description which realizes a file acquisition interface of the SIP telephone set according to the present exemplary embodiment. According to the file acquisition interface which will be described in the following, a data path can be established by the same procedure as that of a transaction at the time of establishment of a voice path session. This is because the SDP for establishing a data path can be partly expanded. Expanded SDP here is assumed to be added to a transaction re-INVITE w/SDP message (T11 in FIG. 6) which will be described later and transmitted. Details will be described later.

Described and stored in the SDP are (1) name and object of a session, (2) time when the session is active, (3) media forming the session, (4) information for receiving the media, (5) information related to a band for use in conference and (6) contact information of a person in charge of the session. Among them, in a part of "m=" (media name and a transmission address) as media description, currently defined in RFC4566 are media types, "audio", "video", "application", "text" and "message". Between the calling device 11 and the call receiving device 12, a connection capacity is determined by the SDP description. Therefore, by newly defining "file" as a media type, a file acquisition interface can be provided which enables file transfer connection between the calling device 11 and the call receiving device 12.

Operation of the First Exemplary Embodiment

Figure 4:
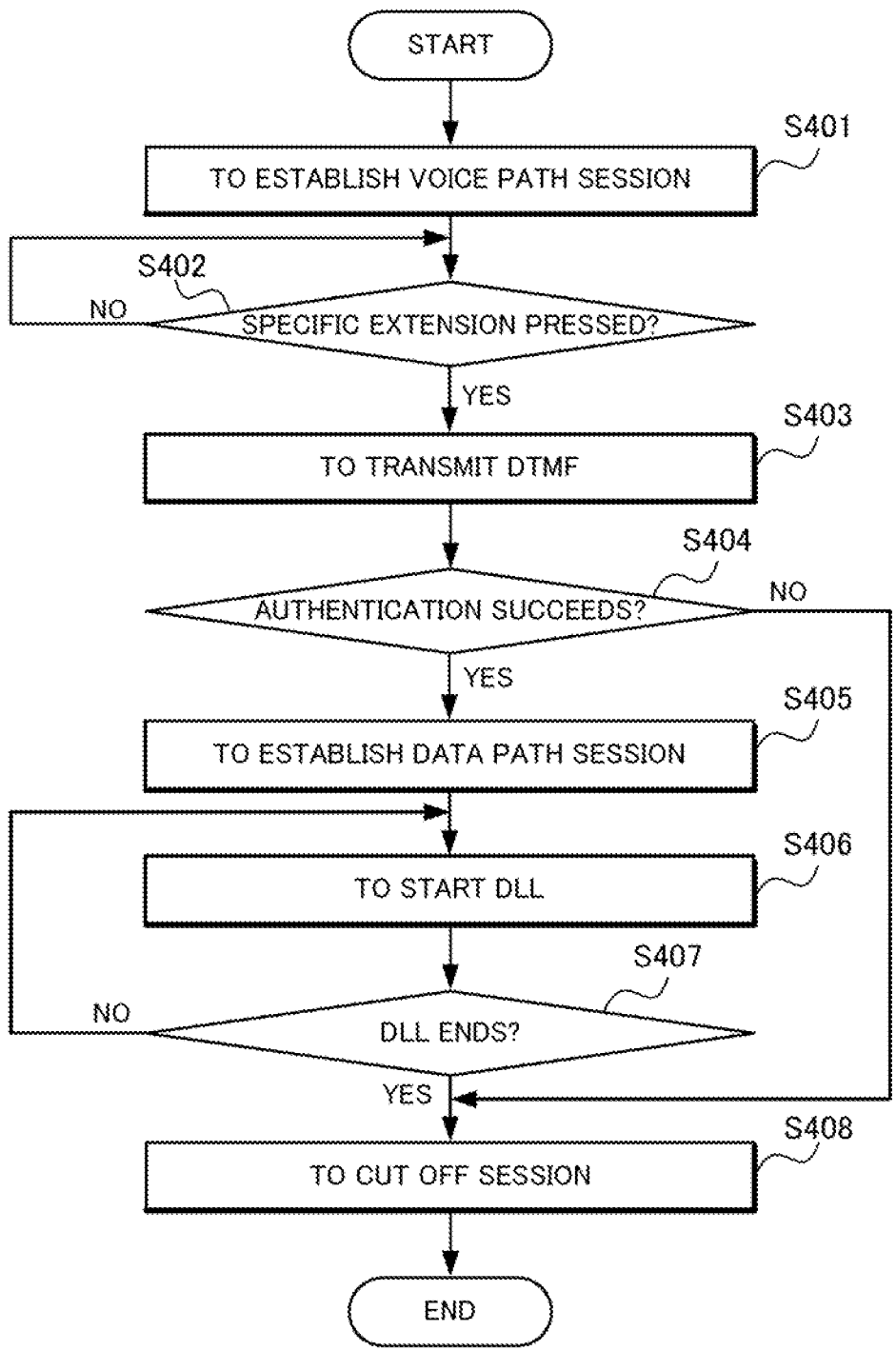
FIG. 4 is a flow chart showing operation of the SIP telephone set according to the present exemplary embodiment.
Figure 5:
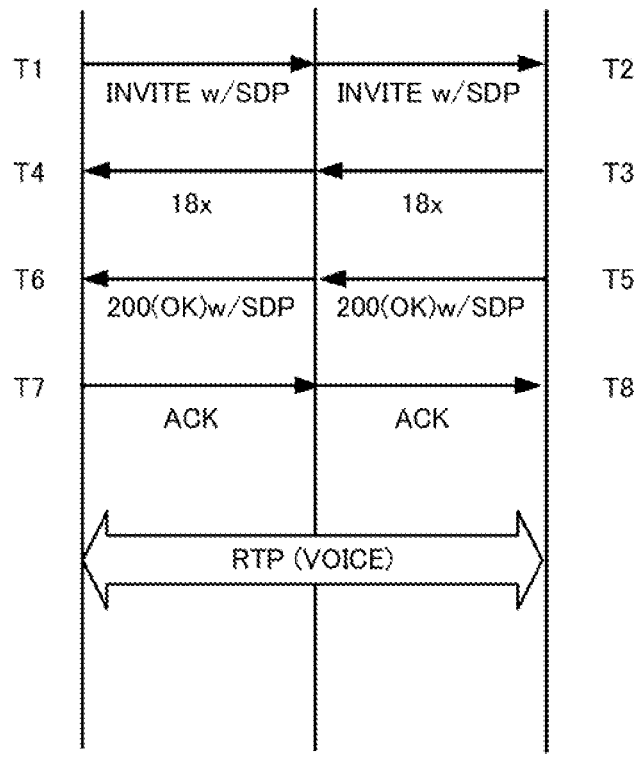
FIG. 5 is a diagram showing a transaction sequence (voice path session establishment) of the file transfer system of the SIP telephone set according to the present exemplary embodiment.

FIG. 4 is a flow chart showing operation of the SIP telephone set according to the present exemplary embodiment. With reference to FIG. 4, the calling device 11 first establishes a session for a voice path with the call receiving device 12 through the proxy server 13 (Step S401). FIG. 5 shows a transaction sequence for this operation.

With reference to FIG. 5, by the transactions T1 through T8, the calling device 11 calls up the call receiving device 12 through the proxy server 13 to establish a voice path session. At the time of executing the procedure, for starting calling, the calling device 11 first transmits an INVITE w/SDP message to the call receiving device 12 (T1, T2) and the call receiving device 12 transmits a Ringing message 18x corresponding to the INVITE message to the calling device 11 (T3, T4). Then, when allowed to respond, the call receiving device 12 transmits a 200(OK) w/SDP message to the calling device 11 (T5, T6) and the calling device 11 transmits an ACK message in response to the 200(OK) w/SDP message to establish a voice path session for telephone communication (T7, T8). Thereafter, telephone communication starts between a caller and a call receiver between the calling device 11 and the call receiving device 12.

Return the description to FIG. 4. After the above-described voice path session establishment at Step S401, when the request issuing unit 111 detects pressing of a specific extension ("Yes" at Step S402), the calling device 11 transmits a DTMF (Dual-Tone Multi-Frequency) to the call receiving device 12 for requesting file acquisition (Step S403).

The call receiving device 12 having received the DTMF authenticates whether an access to a file is authorized or not based on the received DTMF. Then, return a result of the access authentication to the calling device 11 as a requesting source.

When the session establishing unit 112 obtains a result of access authentication to find that the access is not authorized, that is, no authentication fails ("No" at Step S404), the calling device 11 cuts off the session (Step S408). On the other hand, when the access is authorized, that is, the authentication succeeds ("Yes" at Step S404), a session is established for a data path between the calling device 11 and the call receiving device 12 (Step S405).

Subsequently, the session establishing unit 112 shifts the control to the file obtaining unit 113, and the file control unit 113 starts downloading in order to start transfer of a file under the management and stored in the file storage unit 120 of the calling device 12 through the data path whose session is established (Step S406). Mechanism of the file downloading will be described later. Then, after file downloading is completed ("Yes" at Step S407), the control shifts to the session establishing unit 112, so that the session establishing unit 112 cuts off the session to end (Step S408).

Figure 6:
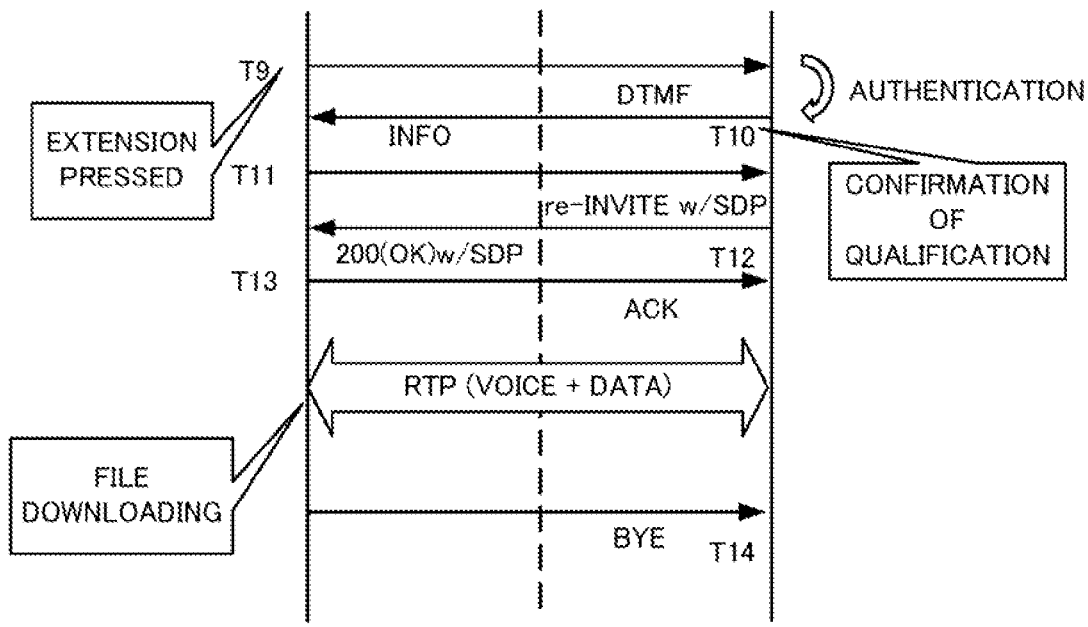
FIG. 6 is a diagram showing a transaction sequence (data path session establishment) of the file transfer system of the SIP telephone set according to the present exemplary embodiment.

FIG. 6 shows a transaction sequence for this operation. With reference to FIG. 6, after the above-described voice path session is established, when detecting the pressing of a specific extension, the calling device 11 transmits a DTMF to the call receiving device 12 for requesting file acquisition (T9). The call receiving device 12 having received the DTMF authenticates whether access to a file is authorized or not based on the received DTMF and returns a result of the access authentication by INFO to the calling device 11 as a requesting source (T10).

Upon receiving the authentication result (authentication succeeds), the calling device 11 transmits a re-INVITE w/SDP message described including the above-described expanded SDP to the call receiving device 12 (T11) and when the call receiving device 12 having received the message is allowed to respond, it transmits a 200(OK) w/SDP message to the calling device 11 (T12). Then, the calling device 11 transmits an ACK message (T13) to establish voice path and data path sessions and starts downloading in order to start transfer of a file under the management of the call receiving device 12 through the voice path and the data path whose sessions are established. Then, after the file downloading is completed, cut off the session to end the transaction sequence (T14).

According to the above-described exemplary embodiment, after the session for the voice path with the call receiving device 12 is established, the calling device 11 is allowed to establish a session for a data path as the extension of the voice path session establishment. Establishment of a voice path enables data exchange, for example, propagation of extension information between the calling device 11 and the call receiving device 12 while executing voice communication between the calling device 11 and the call receiving device 12.

Effects of the First Exemplary Embodiment

According to the present exemplary embodiment, after calling up the call receiving device 12 through the proxy server 13 to establish a voice path session, the calling device 11 can obtain a file under the management of the call receiving device 12 through automatic downloading by the pressing of a specific extension of the calling device 11. Therefore, without depending on a capacity of the proxy server 13, file provision service can be obtained according to capacities of the calling device 11 and the call receiving device 12.

The reason is that after a voice path session is established between the calling device 11 and the call receiving device 12, transmission/reception of a transaction is enabled between the calling device 11 and the call receiving device 12 according to the capacities of the calling device 11 and the call receiving device 12 without passing through the proxy server 13.

In addition, according to the present exemplary embodiment, only the expansion of SDP enables a data path session to be established with ease by the same transaction.

The reason is that a file acquisition interface is provided by newly defining (expansion) "file" for file transfer as a media type of SDP, resulting in enabling the calling device 11 and the call receiving device 12 to be connected with each other in an RFC 4566 SIP transaction without mounting a new application on the calling device 11 and the call receiving device 12.

Structure of Second Exemplary Embodiment

In addition to the structure that the above-described first exemplary embodiment has, adding information "to establish only DTMF path" when the calling device 11 issues a request enables two kinds of control, one for establishing voice and data path sessions and the other for establishing only a data path session. Operation of the SIP telephone set (the calling device 11) in this case is shown in the flow chart in FIG. 7 and its transaction sequence is shown in FIG. 8.

Also in the second exemplary embodiment which will be described in the following, assume similarly to the above-described first exemplary embodiment that the structures of the file transfer system 10 shown in FIG. 1 and the SIP telephone set (the calling device 11) shown in FIG. 2 and the SDP expansion example shown in FIG. 3 are used.

Operation of the Second Exemplary Embodiment

Figure 7:
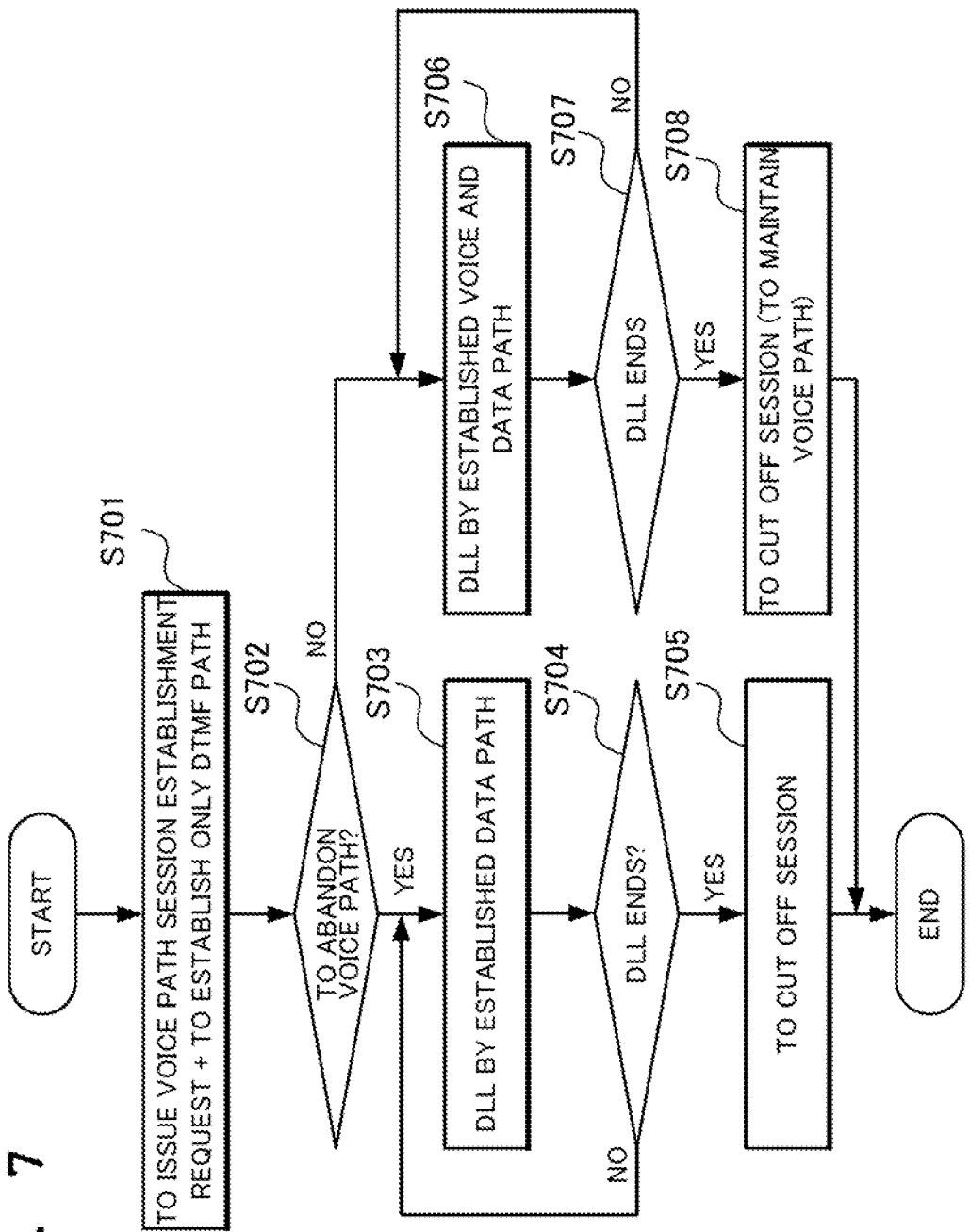
FIG. 7 is a flow chart showing operation of an SIP telephone set according to a second exemplary embodiment.
Figure 8:
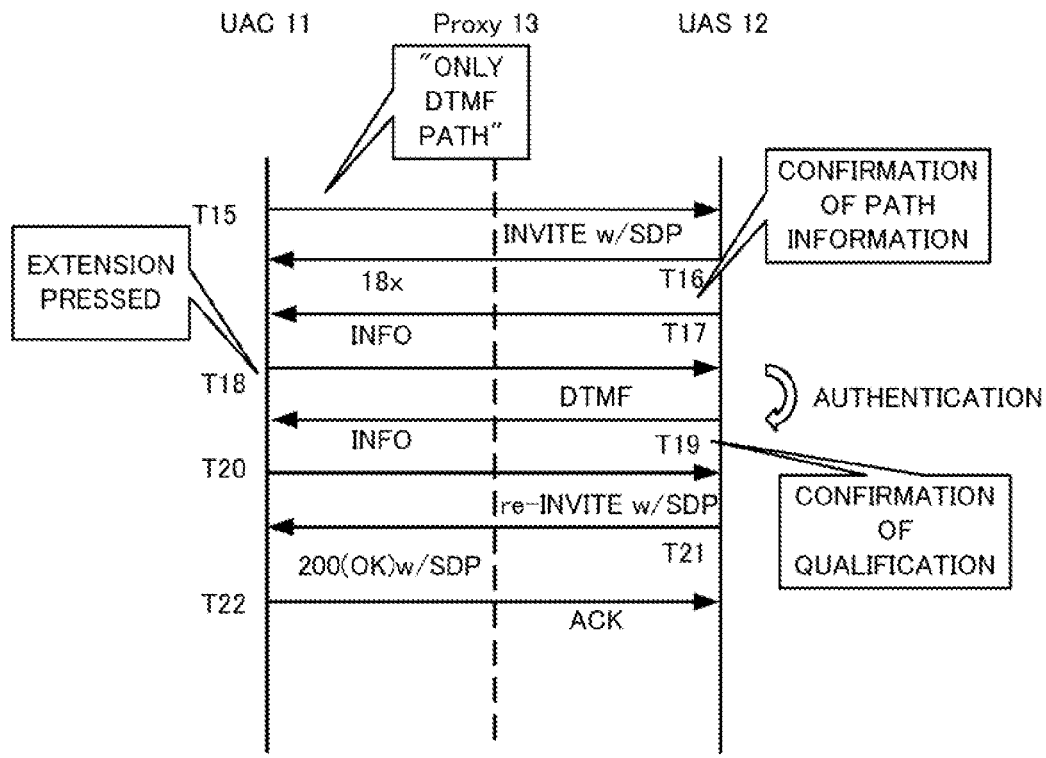
FIG. 8 is a diagram showing a transaction sequence (confirmation of a path to be established) of a file transfer system of the SIP telephone set according to the second exemplary embodiment.

With reference to FIG. 7, to the call receiving device 12, the calling device 11 (the request issuing unit 111) transmits a request made at the time of establishing a voice path session with information "to establish only a DTMF path" added (Step S701). To the calling device 11, the call receiving device 12 having received the request transmits a confirmation that the information "to establish only a DTMF path" is transmitted. The operation to follow is the same as that of the first exemplary embodiment shown in FIG. 4, the operation executed by the calling device 11 to transmit a DTMF to the call receiving device 12 by pressing a specific extension, and the operation executed by the call receiving device 12 to execute access authentication and return its authentication result to the calling device 11 to establish a data path session. Its procedure is omitted from the illustration.

To the above-described confirmation that "to establish only a DTMF path" from the call receiving device 12, the calling device 11 executes different processing when establishing voice and data path sessions and when establishing only a data path session.

More specifically, when establishing sessions for voice and data paths, the call receiving device 12 confirms to the calling device 11 that no voice path will be abandoned. The calling device 11 having received the confirmation ("No" at Step S702) makes a confirmation response by the session establishing unit 112 to download a file through the established voice path and data path by the file obtaining unit 113 (Step S706). After downloading is completed ("Yes" at Step S707), the file obtaining unit 113 shifts the control to the session establishing unit 112, so that the session establishing unit 112 cuts off the data path session and controls to maintain only the voice path session (Step S708). Accordingly, at a time point where the voice path becomes unnecessary, the session establishing unit 112 will cut off the voice path session. As a result, the calling device 11 is allowed to exchange information by telephone communication with the call receiving device 12 even after the file downloading is completed.

On the other hand, when establishing only a data path session, the call receiving device 12 confirms to the calling device 11 that the voice path will be abandoned. The calling device 11 having received the confirmation ("Yes" at Step S702) makes a confirmation response by the session establishing unit 112 to download a file through the established data path by the file obtaining unit 113 (Step S703). After the downloading is completed ("Yes" at Step S704), the file obtaining unit 113 shifts the control to the session establishing unit 112, so that the session establishing unit 112 cuts off the data path session to end a series of operation (Step S705). In this case, the calling device 11 is allowed to automatically download a file without telephone communication with the call receiving device 12.

A transaction sequence is shown in FIG. 8 related to confirmation of path information in response to the above-described confirmation about "to establish only a DTMF path" from the call receiving device 12.

With reference to FIG. 8, by transactions T15 through T17, the calling device 11 calls up the call receiving device 12 through the proxy server 13 to establish a voice path session. At this time, the calling device 11 transmits a generated SIP request with information "to establish only a DTMF path" added (T15). The call receiving device 12 having received the request (T16) makes confirmation (INFO) to the calling device 11 that the information "to establish only a DTMF path" is transmitted (T17).

Subsequently, the calling device 11 detects the pressing of an extension to transmit the DTMF to the call receiving device 12 (T18) and the call receiving device 12 having received the DTMF authenticates an access whether an access to a file stored in the file storage unit 120 is authorized or not based on the DTMF. Then, return the authentication result INFO to the calling device 11 (T19).

The calling device 11 cuts off the session when the authentication fails and establishes a data path session when it succeeds. Data path session establishment is executed by issuance of re-INVITE w/SDP from the calling device 11 (T20), issuance of 200 (OK) w/SDP from the call receiving device 12 in response to the issuance of re-INVITE w/SDP and transmission of an ACK message from the calling device 11 (T22).

Figure 9:
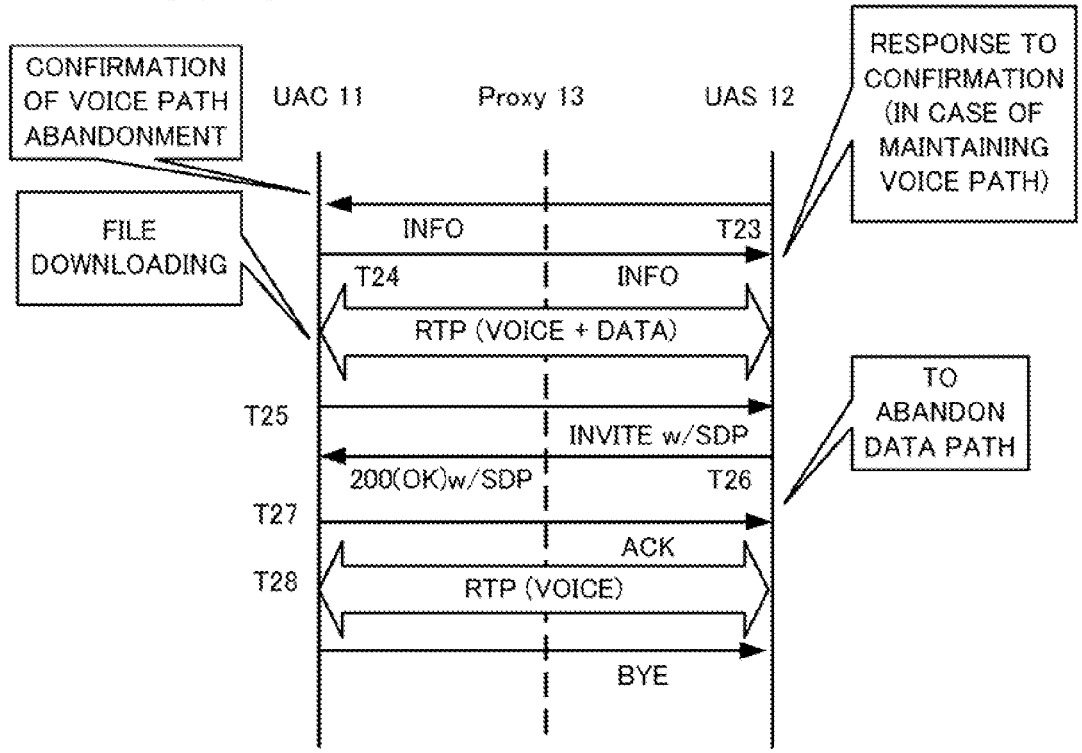
FIG. 9 is a diagram showing a transaction sequence (voice path and data path session establishment) of the file transfer system of the SIP telephone set according to the second exemplary embodiment.
Figure 10:
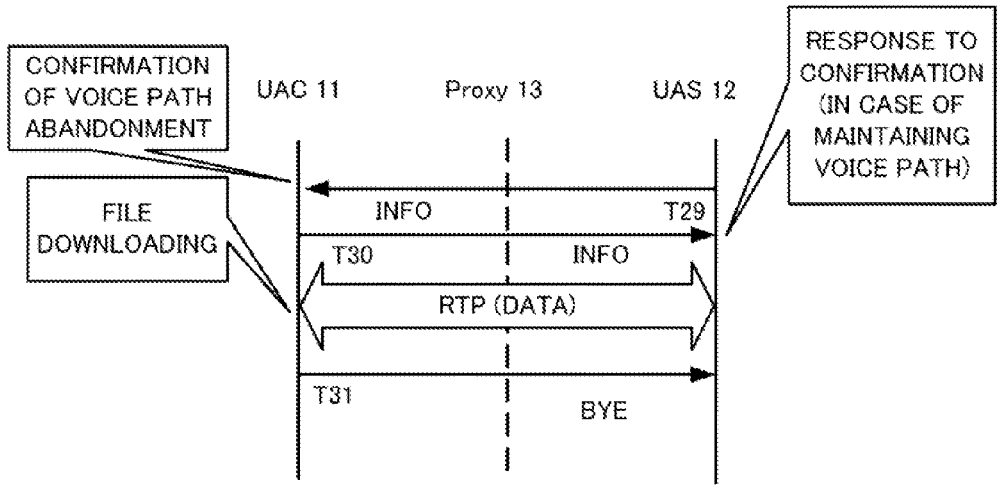
FIG. 10 is a diagram showing a transaction sequence (to establish a session only for a data path) of the file transfer system of the SIP telephone set according to the second exemplary embodiment.

In a case where as a result of addition of the information "to establish only a DTMF path" to the INVITE w/SDP issued in the transaction T15, sessions for voice and data paths are to be established in response to the confirmation about "to establish only a DTMF path" from the call receiving device 12, the transaction sequence shown in FIG. 9 is executed and in a case where only a data path session is to be established, that shown in FIG. 10 is executed.

With reference to FIG. 9, the call receiving device 12 confirms to the calling device 11 that no voice path will be abandoned (T23) and the session establishing unit 112 responsively returns a response (T24). Subsequently, the calling device 11 starts downloading a file through the established voice path and data path. Mechanism of an interface which executes file downloading is conformed to the description of the SDP shown in FIG. 3. After the file downloading is completed, the calling device 11 cuts off the data path session to end the present sequence (T28). In this case, the calling device 11 is allowed to exchange information by telephone conversation even after the file is downloaded and obtained from the call receiving device 12 as described above.

With reference to FIG. 10, the call receiving device 12 confirms to the calling device 11 that the voice path will be abandoned (T29) and returns a response to the confirmation (T30). Subsequently, the calling device 11 starts downloading a file through the established data path. Mechanism of an interface which executes file downloading is conformed to the description of the SDP shown in FIG. 3. After the file downloading is completed, the calling device 11 cuts off the data path session to end the present sequence (T31). In this case, the calling device 11 is allowed to automatically download a file without telephone conversation with the call receiving device 12.

Effects of the Second Exemplary Embodiment

According to the present exemplary embodiment, since sessions for a voice path and a data path can be simultaneously established between the calling device 11 and the call receiving device 12, data exchange is enabled while exchanging voice. Also according to the present exemplary embodiment, since only a session for a data path can be established between the calling device 11 and the call receiving device 12 without passing through the proxy server 13, data transmission/reception is enabled with ease by simplified operation of the calling device 11 and the call receiving device 12. Accordingly, between the calling device 11 and the call receiving device 12, voice communication and file access can be simultaneously realized with a distant place or a file at a remote place can be automatically accessed as the extension of extension telephone operation.

The reason is that between the calling device 11 and the call receiving device 12, at the time of establishing a session, it is possible to designate a case of simultaneously establishing a voice path and a data path as the extension of voice path establishing operation or a case of establishing only a data path.

Figure 11:
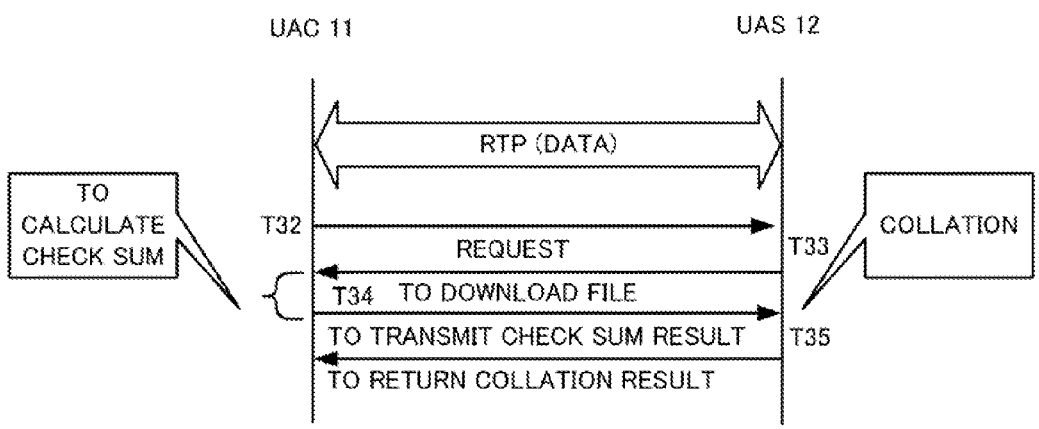
FIG. 11 is a diagram showing a transaction sequence (file transfer) of the file transfer system of the SIP telephone set according to the second exemplary embodiment.

In the above-described first and second exemplary embodiments, a mechanism of an application in file downloading can be assumed by the transaction sequence shown in FIG. 11.

With reference to FIG. 11, after a data path is established, the calling device 11 (the file obtaining unit 113) transmits a request for file downloading to the call receiving device 12 (T32). The call receiving device 12 presents a public file based on a received DTMF and transfers the file to the calling device 11 (T33). After the file is transferred from the call receiving device 12 to the calling device 11, the file obtaining unit 113 calculates a check sum on a transfer unit basis and transmits a result of the check sum to the call receiving device 12 (T34).

The call receiving device 12 responsively refers to the received check sum and a check sum that the call receiving device 12 has to collate them with a previously received check sum and transmits a result to the calling device 11 (the file obtaining unit 113) (T35). In the calling device 11, the control shifts to the session establishing unit 12 depending on the collation result to end the sequences when having no problem and otherwise repeat the sequences following T32.

The functions that the SIP telephone set 10 which are shown in FIG. 2 may be all realized in software or at least a part of them may be realized in hardware. Each of such data processing may be realized by one or a plurality of programs on a computer or at least part of it may be realized in hardware as processing executed by the request issuing unit 111 to request the call receiving device 12 to establish a data path session by the pressing of a specific extension at the time of a voice path session, processing executed by the session establishing unit 112 to obtain an access authentication result by the pressing of the specific extension to establish a session for a data path with the call receiving device 12 and processing executed by the file obtaining unit 113 to obtain a file managed by the call receiving device 12 from the call receiving device 12 independently of the proxy server 13 after the data path session is established.

Although the present invention has been described with respect to the preferred modes of implementation and exemplary embodiments in the foregoing, the present invention is not necessarily limited to the above-described modes of implementation and exemplary embodiments and can be implemented in various modifications without departing from the scope of its technical idea.

The whole or part of the exemplary embodiments disclosed above can be described as, but not limited to, the following supplementary notes.

(Supplementary note 1) An SIP telephone set which makes a call through a proxy server to establish a session for a voice path with a call receiving device conformed to SIP (Session Initiation Protocol), comprising:

a request issuing unit which requests said call receiving device to establish a session for a data path by the pressing of a specific extension at the time of establishment of a session for said voice path, a session establishing unit which obtains an access authentication result by the pressing of said specific extension to establish a session for a data path with said call receiving device, and a file obtaining unit which obtains a file managed by the call receiving device from said call receiving device independently of said proxy server after a session for said data path is established.

(Supplementary note 2) The SIP telephone set according to Supplementary note 1, wherein said session establishing unit, when establishing a session for said voice path and data path, responds to a request for confirmation that no voice path will be abandoned from said call receiving device and instructs said file obtaining unit to obtain a file through said established voice path and data path and after said file is obtained, cuts off the session for said data path.

(Supplementary note 3) The SIP telephone set according to Supplementary note 1, wherein said session establishing unit, when establishing only said data session, responds to a request for confirmation that a voice path will be abandoned from said call receiving device and instructs said file obtaining unit to obtain a file through said established data path and after said file is obtained, cuts off the session for said data path.

(Supplementary note 4) The SIP telephone set according to any one of Supplementary note 1 through Supplementary note 3, wherein said file obtaining unit, as a media type of SDP (Session Description Protocol), decodes description newly defined for obtaining said file and obtains said file from said call receiving device.

(Supplementary note 5) The SIP telephone set according to any one of Supplementary note 1 through Supplementary note 4, wherein said file obtaining unit, after a data path is established by said session establishing unit, issues a file acquisition request to said call receiving device to obtain a requested file from said call receiving device and issues another file acquisition request or ends based on collation of a result of error check executed at said call receiving device.

(Supplementary note 6) A file transfer system in an SIP telephone set in which a calling device and a call receiving device establish a session for a voice path through a proxy server to communicate conformed to SIP, comprising:

said calling device which requests said call receiving device to establish a session for a data path by the pressing of a specific extension at the time of establishment of a session for said voice path, and said call receiving device which receives a request for establishing a session for said data path from said calling device to execute access authentication of said calling device, wherein said calling device obtains a result of said access authentication from said call receiving device to establish a session for a data path with said call receiving device, and after the session for said data path is established, obtains a file managed by the call receiving device from said call receiving device independently of said proxy server.

(Supplementary note 7) A file transfer method in an SIP telephone set in which a calling device and a call receiving device establish a session for a voice path through a proxy server to communicate conformed to SIP, comprising:

the first step by said calling device to request said call receiving device to establish a session for a data path by the pressing of a specific extension at the time of establishment of a session for said voice path, the second step by said call receiving device to receive a request for establishing a session for said data path from said calling device to execute access authentication of said calling device, and the third step by said calling device to obtain a result of said access authentication from said call receiving device to establish a session for a data path with said call receiving device, and after the session for said data path is established, obtain a file managed by the call receiving device from said call receiving device independently of said proxy server.

(Supplementary note 8) The file transfer method in an SIP telephone set according to Supplementary note 7, wherein said second step includes:

processing of, when establishing a session for said voice path and data path, responding to a request for confirmation that no voice path will be abandoned from said call receiving device, processing of instructing on file transfer through said established voice path and data path after the sessions for said voice path and data path are established, and processing of, after said file is obtained, cutting off the session for said data path.

(Supplementary note 9) The file transfer method in an SIP telephone set according to Supplementary note 7, wherein said second step includes the sub-steps of:

when establishing only a session for said data path, responding to a request for confirmation that a voice path will be abandoned from said call receiving device, instructing on file transfer through said established data path after the session of said data path is established, and cutting off the session for said data path after said file is obtained.

(Supplementary note 10) The file transfer method in an SIP telephone set according to any one of Supplementary note 7 through Supplementary note 9, wherein said third step includes the sub-step of, as a media type of SDP, decoding description newly defined for obtaining said file and executing data transfer to/from said call receiving device through said established voice path and data path or a data path.

(Supplementary note 11) The file transfer method in an SIP telephone set according to any one of Supplementary note 7 through Supplementary note 10, wherein said third step includes sub-steps of:

after said data path is established, issuing a file acquisition request to said call receiving device, and obtaining a file by data transfer to/from said call receiving device and issuing another file acquisition request or ending based on collation of a result of error check executed at said call receiving device.

(Supplementary note 12) A computer readable medium storing a file transfer program of an SIP telephone set executed on a computer to make a call through a proxy server and establish a session for a voice path with a call receiving device conformed to SIP, said file transfer program causes said computer to execute:

a request issuing processing of requesting said call receiving device to establish a session for a data path by the pressing of a specific extension at the time of establishment of a session for said voice path;

a session establishing processing of obtaining an access authentication result by the pressing of said specific extension to establish a session for a data path with said call receiving device; and a file obtaining processing of obtaining a file managed by the call receiving device from said call receiving device independently of said proxy server after the session for said data path is established.

(Supplementary note 13) The computer readable medium according to Supplementary note 12, wherein said session establishing processing includes the processing of:

when establishing a session for said voice path and data path, responding to a request for confirmation that no voice path will be abandoned from said call receiving device, instructing on file transfer through said established voice path and data path after sessions for said voice path and data path are established, and cutting off the session for said data path after said file is obtained.

(Supplementary note 14) The computer readable medium according to Supplementary note 12, wherein said session establishing processing includes the processing of:

when establishing only a session for said data path, responding to a request for confirmation that a voice path will be abandoned from said call receiving device, instructing on file transfer through said established data path after the session for said data path is established, and cutting off the session for said data path after said file is obtained.

(Supplementary note 15) The computer readable medium according to any one of Supplementary note 12 through Supplementary note 14, wherein said file obtaining processing includes a processing of, as a media type of SDP, decoding description newly defined for obtaining said file and executing data transfer to/from said call receiving device through said established voice path and data path or a data path.

(Supplementary note 16) The computer readable medium according to any one of Supplementary note 12 through Supplementary note 15, wherein said file obtaining processing includes the processing of:

after said data path is established, issuing a file acquisition request to said call receiving device, and obtaining a file by data transfer to/from said call receiving device and issuing another file acquisition request or ending based on collation of a result of error check executed at said call receiving device.

INDUSTRIAL APPLICABILITY

According to the present invention, since the calling device 11 (SIP telephone set) calls up the call receiving device 12 through the proxy server 13 to automatically download and obtain a file under the management of the call receiving device 12 by the pressing of a specific extension of the calling device 11 independently of the proxy server 13, conspicuous effects can be obtained by the use for every application in which a file is transferred by using SIP for establishing a session between two or more clients which is used, in particular, in an IP telephone set or the like to which a multimedia session or VoIP is applied.

What is claimed is:

1. An SIP telephone set which makes a call through a proxy server to establish a session for a voice path with a call receiving device conformed to SIP (Session Initiation Protocol), comprising:
a processor; and
a memory;
wherein said processor executes
a request issuing unit which requests said call receiving device to establish a session for a data path by the pressing a specific key pressing sequence defined in advance at the time of establishment of a session for said voice path;
a session establishing unit which obtains an access authentication result by the pressing of said specific extension to establish a session for a data path with said call receiving device; and
a file obtaining unit which obtains a file managed by the call receiving device from said call receiving device independently of said proxy server after a session for said data path is established,
wherein a file acquisition interface is provided by newly defined description in a media type of SDP (Session Description Protocol) for obtaining said file,
wherein said file obtaining unit decodes said newly defined description and automatically obtains said file indicated by said newly defined description from said call receiving device,
wherein said session establishing unit, when establishing a session for said voice path and data path, responds to a request for confirmation that no voice path will be abandoned from said call receiving device and instructs said file obtaining unit to obtain a file through said established voice path and data path after said file is obtained, cuts off the session for said data path,
wherein said session establishing unit, when establishing only said data session, responds to a request for confirmation that a voice path will be abandoned from said call receiving device and instructs said file obtaining unit to obtain a file through said established data path and after said file is obtained, cuts off the session for said data path.

2. The SIP telephone set according to claim 1, wherein said file obtaining unit, after a data path is established by said session establishing unit, issues a file acquisition request to said call receiving device to obtain a requested file from said call receiving device and issues another file acquisition request or ends based on collation of a result of error check executed at said call receiving device.

3. A file transfer method in an SIP telephone set in which a calling device and a call receiving device establish a session for a voice path through a proxy server to communicate conformed to SIP, comprising:
a first step by said calling device to request said call receiving device to establish a session for a data path by a specification key pressing sequence defined in advance at the time of establishment of a session for said voice path;
a second step by said call receiving device to receive a request for establishing a session for said data path from said calling device to execute access authentication of said calling device; and
a third step by said calling device to obtain a result of said access authentication from said call receiving device to establish a session for a data path with said call receiving device, and after the session for said data path is established, obtain a file managed by the call receiving device from said call receiving device independently of said proxy server,
wherein a file acquisition interface is provided by a newly defined description in a media type of SDP (Session Description Protocol) for obtaining said file,
wherein said third step includes the sub-step of decoding said newly defined description and automatically obtaining said file indicated by said newly defined description from said call receiving device,
wherein said second step includes:
processing of, when establishing a session for said voice path and data path, responding to a request for confirmation that no voice path will be abandoned from said call receiving device, processing of instructing on file transfer through said established voice path and data path after the sessions for said voice path and data path are established, and
processing of, after said file is obtained, cutting off the session for said data path,
wherein said second step includes the sub-steps of:
when establishing only a session for said data path, responding to a request for confirmation that a voice path will be abandoned from said call receiving device,
instructing on file transfer through said established data path after the session 10 of said data path is established, and
cutting off the session for said data path after said file is obtained.

4. The file transfer method in an SIP telephone set 20 according to claim 3, wherein said third step includes substeps of:
after said data path is established, issuing a file acquisition request to said call receiving device, and
obtaining a file by data transfer to/from said call receiving device and issuing another file acquisition request or ending based on collation of a result of error check executed at said call receiving device.

5. A non-transitory computer-readable storage medium storing a file transfer program of an SIP telephone set executed on a computer to make a call through a proxy server and establish a session for a voice path with a call receiving device conformed to SIP, wherein said file transfer program causes said computer to execute:
a request issuing processing of requesting said call receiving device to establish a session for a data path by a specific key pressing sequence defined in advance at the time of establishment of a session for said voice path;
a session establishing processing of obtaining an access authentication result by the pressing of said specific extension to establish a session for a data path with said call receiving device; and
a file obtaining processing of obtaining a file managed by the call receiving device from said call receiving device independently of said proxy server after the session for said data path is established,
wherein a file acquisition interface is provided by a newly defined description in a media type of SDP (Session Description Protocol) for obtaining said file,
wherein said file obtaining processing includes a processing of decoding said newly defined description and automatically obtaining said file indicated by said newly defined description from said call receiving device, wherein said session establishing processing includes the processing of:

when establishing a session for said voice path and data path, responding to a request for confirmation that no voice path will be abandoned from said call receiving device, instructing on file transfer through said established voice path and data path after sessions for said voice path and data path are established, and cutting off the session for said data path after said file is obtained, wherein said session establishing processing includes the processing of:

when establishing only a session for said data path, responding to a request for confirmation that a voice path will be abandoned from said call receiving device, instructing on file transfer through said established data path after the session for said data path is established, and cutting off the session for said data path after said file is obtained.

6. The non-transitory computer-readable storage medium according to claim 5, wherein said file obtaining processing includes the processing of:

after said data path is established, issuing a file acquisition request to said call receiving device, and obtaining a file by data transfer to/from said call receiving device and issuing another file acquisition request or ending based on collation of a result of error check executed at said call receiving device.

* * * * *